US010028274B2

(12) United States Patent
Padfield et al.

(10) Patent No.: US 10,028,274 B2
(45) Date of Patent: Jul. 17, 2018

(54) TECHNIQUES FOR PROVIDING FRONT-HAUL DATA AWARENESS

(71) Applicant: Viavi Solutions UK Limited, Berkshire (GB)

(72) Inventors: David Charles Padfield, Wiltshire (GB); Christopher Michael Murphy, Bath (GB); Howard John Thomas, Stonehouse (GB)

(73) Assignee: Viavi Solutions UK Limited, Berkshire (GB)

( * ) Notice: Subject to any disclaimer, the term of this patent is extended or adjusted under 35 U.S.C. 154(b) by 143 days.

(21) Appl. No.: 15/066,443

(22) Filed: Mar. 10, 2016

(65) Prior Publication Data

US 2016/0309465 A1 Oct. 20, 2016

Related U.S. Application Data

(60) Provisional application No. 62/147,827, filed on Apr. 15, 2015.

(51) Int. Cl.
*H04W 72/04* (2009.01)
*H04W 72/10* (2009.01)
*H04B 10/2575* (2013.01)
*H04L 5/00* (2006.01)
*H04W 28/02* (2009.01)

(52) U.S. Cl.
CPC .. *H04W 72/0446* (2013.01); *H04B 10/25758* (2013.01); *H04L 5/0005* (2013.01); *H04L 5/0035* (2013.01); *H04L 5/0053* (2013.01); *H04L 5/0064* (2013.01); *H04W 28/0205* (2013.01); *H04W 72/10* (2013.01)

(58) Field of Classification Search
None
See application file for complete search history.

(56) References Cited

U.S. PATENT DOCUMENTS

| 8,213,800 | B1 * | 7/2012 | Liu | H04B 10/25752 398/115 |
|---|---|---|---|---|
| 9,642,155 | B2 * | 5/2017 | Wijetunge | H04W 72/1226 |
| 9,774,525 | B2 * | 9/2017 | Chowdhury | H04L 47/56 |
| 9,775,045 | B2 * | 9/2017 | Li | H04W 16/02 |
| 2014/0169798 | A1 * | 6/2014 | Oh | H04B 10/25758 398/116 |

(Continued)

OTHER PUBLICATIONS

European Search Report for European Application No. 16165425.6; dated Sep. 2, 2016.

(Continued)

*Primary Examiner* — Robert C. Scheibel
(74) *Attorney, Agent, or Firm* — Harrity & Harrity, LLP

(57) ABSTRACT

A device may include one or more processors. The device may receive, via a plurality of data streams of a front haul link, a set of packets including information for transmission via an air interface. The set of packets may be associated with a data prioritization relating to transmission via the air interface. The set of packets may include information of a time-frequency resource element array. The device may reconstruct a set of time-frequency resource elements of the time-frequency resource element array based on the data prioritization of the set of packets. The device may transmit, via the air interface, the time-frequency resource element array.

20 Claims, 5 Drawing Sheets

(56) References Cited

U.S. PATENT DOCUMENTS

| | | | |
|---|---|---|---|
| 2014/0226481 A1* | 8/2014 | Dahod | H04W 36/0055 |
| | | | 370/235 |
| 2014/0233479 A1* | 8/2014 | Dahod | H04W 72/044 |
| | | | 370/329 |
| 2014/0286256 A1* | 9/2014 | Chowdhury | H04L 47/56 |
| | | | 370/329 |
| 2014/0362763 A1* | 12/2014 | Hu | H04W 88/085 |
| | | | 370/315 |
| 2015/0110497 A1* | 4/2015 | Zhou | H04B 10/25 |
| | | | 398/116 |
| 2016/0105376 A1* | 4/2016 | Cvijetic | H04L 47/821 |
| | | | 709/224 |
| 2016/0294698 A1* | 10/2016 | Berberana Fernandez-Murias | H04L 47/12 |
| 2017/0208496 A1* | 7/2017 | Chow | H04W 28/021 |
| 2017/0288828 A1* | 10/2017 | Liu | H04L 5/0039 |

OTHER PUBLICATIONS

Chanclou, Philippe et al., "Optical Fiber Solution for Mobile Fronthaul to Achieve Cloud Radio Access Network", Future Network & Mobile Summit 2013, 2013, pp. 1-11.

Wan, Tao et al., "A Performance Study of CPRI over Ethernet", IEEE draft, vol. 802.3, 2015, pp. 1-12.

* cited by examiner

TECHNIQUES FOR PROVIDING FRONT-HAUL DATA AWARENESS

RELATED APPLICATION(S)

This application claims priority under 35 U.S.C. § 119 to U.S. Provisional Patent Application No. 62/147,827, filed on Apr. 15, 2015, the content of which is incorporated by reference herein in its entirety.

TECHNICAL FIELD

The present disclosure relates to a wireless telecommunications system, and more particularly, to techniques for providing front-haul data awareness.

BACKGROUND

Mobile communication devices, such as smart phones, tablets, and other electronic hand-held devices, are becoming increasingly popular. These mobile communication devices depend on cellular radio networks to function. In cellular radio networks, the interface between a base band unit (BBU) and the remote radio unit (RRU), as defined by common public radio interface (CPRI)), may have very stringent bandwidth and latency requirements. As a result, there may be increased cost and complexity of remote radio head (RRH) deployment, particularly when more complex implementation scenarios are considered, for example, in uplink or downlink coordinated multipoint (CoMP), multi-site carrier aggregation, higher multiple input, multiple output (MIMO) in 5G and beamforming, or the like. In view of the foregoing, it may be understood that there are significant problems and shortcomings associated with current solutions and technologies for providing front-haul data awareness.

SUMMARY

According to some possible implementations, a device may include one or more processors. The one or more processors may receive, via a plurality of data streams of a front haul link, a set of packets including information for transmission via an air interface. The set of packets may be associated with a data prioritization relating to transmission via the air interface. The set of packets may include information of a time-frequency resource element array. The one or more processors may reconstruct a set of time-frequency resource elements of the time-frequency resource element array based on the data prioritization of the set of packets. The one or more processors may transmit, via the air interface, the time-frequency resource element array.

According to some possible implementations, the one or more processors, when reconstructing the set of time-frequency resource elements, may identify a set of symbols included in the set of packets. The one or more processors, when reconstructing the set of time-frequency resource elements, may include the set of symbols in a set of sub-frames of a particular time-frequency resource element of the set of time-frequency resource elements.

According to some possible implementations, the one or more processors may determine that a first symbol, of the set of symbols, is associated with a higher prioritization than a second symbol, of the set of symbols, based on the data prioritization. The one or more processors, when including the set of symbols in the set of sub-frames, may identify a first portion of the particular time-frequency resource element assigned to receive data associated with a higher prioritization than data received in a second portion of the particular time-frequency resource element. The first portion may be associated with being transmitted after the second portion. The one or more processors, when including the set of symbols in the set of sub-frames, may include the first symbol in the first portion and the second symbol in the second portion.

According to some possible implementations, the one or more processors may determine a characteristic of the air interface. The characteristic of the air interface may relate to the data prioritization. The characteristic of the air interface may relate to a bandwidth availability, a delay, or a jitter.

According to some possible implementations, the one or more processors may generate an I-Q data stream based on reconstructing the set of time-frequency resource elements of the time-frequency resource element array. The one or more processors may, when transmitting the time-frequency resource element array, may transmit the I-Q data stream.

According to some possible implementations, the one or more processors may generate one or more packets. The one or more packets may be different from the set of packets received via the plurality of data streams of the front haul link. The one or more processors, when reconstructing the set of time-frequency resource elements, may include the one or more packets in the set of time-frequency resource elements.

According to some possible implementations, the one or more processors, when transmitting the time-frequency resource element array, may transmit one or more packets toward a particular mobile device. The particular mobile device may be associated with a service level corresponding to a data prioritization for the one or more packets.

According to some possible implementations, the one or more processors, when receiving the set of packets, are to receive a portion of a dataset via the set of packets. The dataset may be intended for transmission via the air interface. The portion of the dataset may be selected for transmission via the front haul link based on the data prioritization or a characteristic of the air interface. Another portion of the dataset may be excluded from the set of packets and dropped based on the data prioritization or the characteristic of the air interface.

According to some possible implementations, a device may include one or more processors. The one or more processors may receive, via a plurality of data streams of an air interface, a set of signals including information for transmission over a front haul link. The set of signals may be associated with a data prioritization relating to reception via the air interface. The set of signals may include information related to a time-frequency resource element array. The one or more processors may select a portion of data included in the set of signals for transmission via the front haul link based on the data prioritization. The one or more processors may cause the one or more processors to transmit, via the front haul link, the selected portion of data.

According to some possible implementations, the one or more processors may receive, via another plurality of data streams of the front haul link, another set of signals including information for transmission via the air interface. The other set of signals may be associated with another data prioritization relating to transmission via the air interface. The other set of signals may include information related to another time-frequency resource element array. The one or more processors may reconstruct a set of time-frequency resource elements of the other time-frequency resource element array based on the other data prioritization of the other set of signals. The one or more processors may transmit, via the air interface, the other time-frequency resource element array.

According to some possible implementations, the one or more processors may identify a first subset of time-frequency resource elements of the other set of signals for inclusion in the other time-frequency resource element array based on the other data prioritization. The one or more processors may identify a second subset of time-frequency resource elements of the other set of signals for exclusion from the other time-frequency resource element array based on the other data prioritization. The one or more processors, when reconstructing the set of time-frequency resource elements, may include the first subset of time-frequency resource elements and exclude the second subset of time-frequency resource elements.

According to some possible implementations, the other set of signals may be a portion of a dataset for transmission via the air interface. Another portion of the dataset for transmission via the air interface may be dropped prior to transmission via the front haul link based on the data prioritization. The portion of the dataset may be received via the front haul link based on being selected for transmission based on the data prioritization.

According to some possible implementations, the one or more processors may select another portion of the data included in the set of signals that is not be transmitted via the front haul link. The one or more processors may drop the other portion of the data.

According to some possible implementations, the one or more processors, when receiving the set of signals, may receive the set of signals via a set of co-located antennas. The set of signals may be included in a multi-stream multiple-input, multiple-output (MIMO) transmission. The one or more processors may receive the set of signals via a set of multi-site coordinated multipoint (CoMP) antennas.

According to some possible implementations, a method may include receiving, by a device, data for transmission via an air interface to one or more mobile devices. The data may be associated with a prioritization parameter. The method may include selecting, by the device, a remote radio head (RRH) for performing the transmission via the air interface to the one or more mobile devices. The method may include transmitting, by the device, the data to the RRH via a particular data stream, of a set of data streams, of a front haul link connecting the device to the RRH. The particular data stream may be associated with a level of service corresponding to the prioritization parameter of the data.

According to some possible implementations selecting the RRH may include selecting the RRH based on the prioritization parameter and based on a characteristic of the particular data stream or the air interface.

According to some possible implementations, transmitting the data may include transmitting the data via a set of packets. The RRH may be caused to arrange the set of packets and one or more other packets received via one or more other data streams for transmission via a resource element array based on the prioritization parameter for the data and one or more other prioritization parameters relating to the one or more other packets.

According to some possible implementations, the method may include causing a first portion of the data to be transmitted by the RRH via a first transmission. The method may include causing a second portion of the data to be stored via a data structure of the RRH for transmission via a second transmission. The second transmission may occur after the first transmission.

According to some possible implementations, a front haul link may traverse a set of sublinks connecting the RRH to the device. The transmitting data may include transmitting the data toward the RRH via the set of sublinks. The set of sublinks may be associated with a particular topology.

According to some possible implementations, the method may include determining the prioritization parameter based on a delay requirement or a synchronization requirement associated with the data. The method may include selecting the particular data stream from the set of data streams based on the prioritization parameter. Transmitting the data may include transmitting the data based on selecting the particular data stream.

DETAILED DESCRIPTION

In order to facilitate a fuller understanding of the exemplary embodiments, reference is now made to the appended drawings, in which like elements are referenced with like numerals. These drawings should not be construed as limiting the present disclosure, but are intended to be illustrative only.

The interface between a BBU and an RRU, as defined by CPRI, has very stringent bandwidth and latency requirements that may lead to increased cost and complexity for RRH deployment, particularly when more complex implementation scenarios are considered, such as, in uplink or downlink CoMP (coordinated multipoint), multi-site carrier aggregation, higher MIMO in 5G and beamforming, or the like.

Accordingly, the present disclosure may provide a method to alter the structure of the transport link (front-haul) between a base band unit (BBU) and a remote radio unit (RRU) in an radio communications system (e.g., OFDM) such that components of the data on the front haul link may be identified as having different service requirements or are transmitted over different radio channel conditions and responsive to the requirements or channel conditions providing differentiated service levels to the components with correspondingly lower bandwidth requirements.

The following figures may illustrate physical layer processing functions of a typical LTE implementation, the resulting time-frequency resource element array, and a typical front-haul implementation. Other embodiments may also be provided as well.

Figure 1:
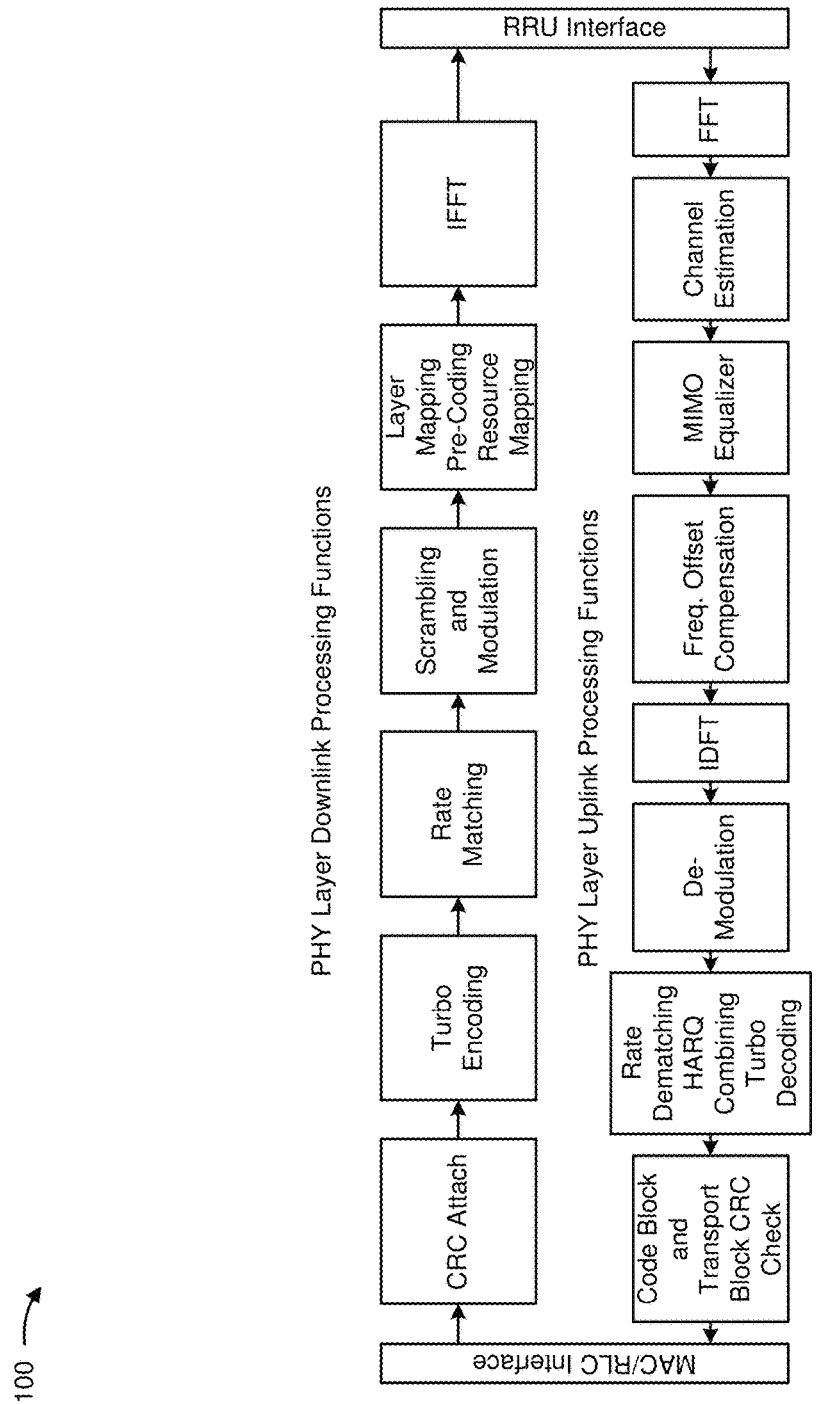
FIG. 1 depicts physical layer downlink and uplink processing functions for providing front-haul data awareness, according to an exemplary embodiment.

FIG. 1 is an example implementation 100 illustrating a typical arrangement for LTE physical layer UL and DL processing functions. Considering the downlink, layer mapping/pre-coding/resource mapping block may create a set of parallel inputs, one per sub-carrier and the IFFT stage may create a serial I&Q stream from the parallel data set and may present this to the RRU interface.

Figure 2:
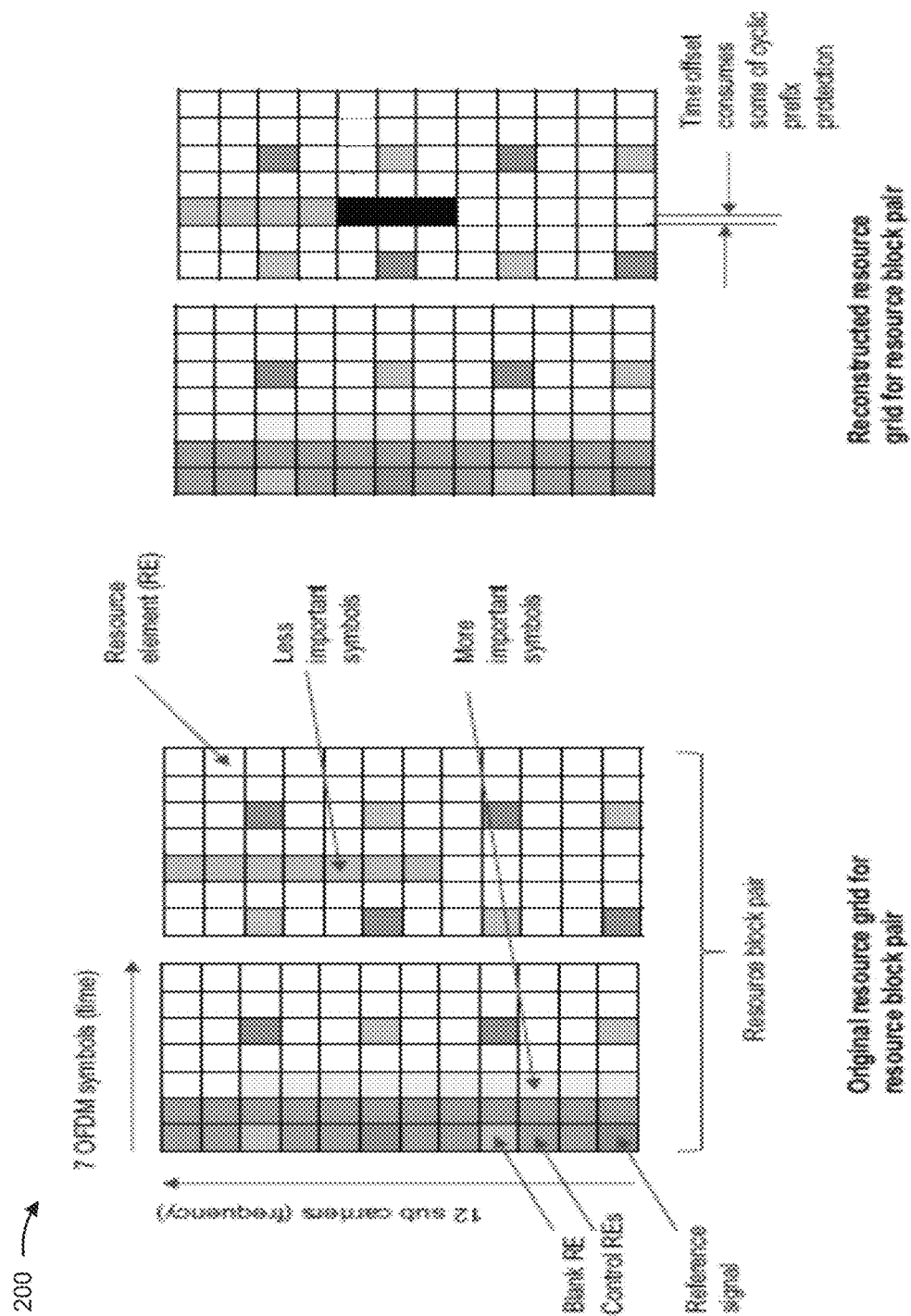
FIG. 2 depicts output data for a mapping function for providing front-haul data awareness, according to an exemplary embodiment.

FIG. 2 is an example implementation 200 illustrating an output of the "Layer mapping, pre-coding, resource mapping" function of FIG. 1, which may be a time-frequency resource element (RE) array, where frequency counted in sub-carriers is on the y-axis and time counted in OFDM symbols on the x-axis. The OFDM symbols 0-6 and in the 1st sub-frame and 7-13 in the 2nd sub-frame and the y-axis represents the power of the resource-elements.

Figure 3:
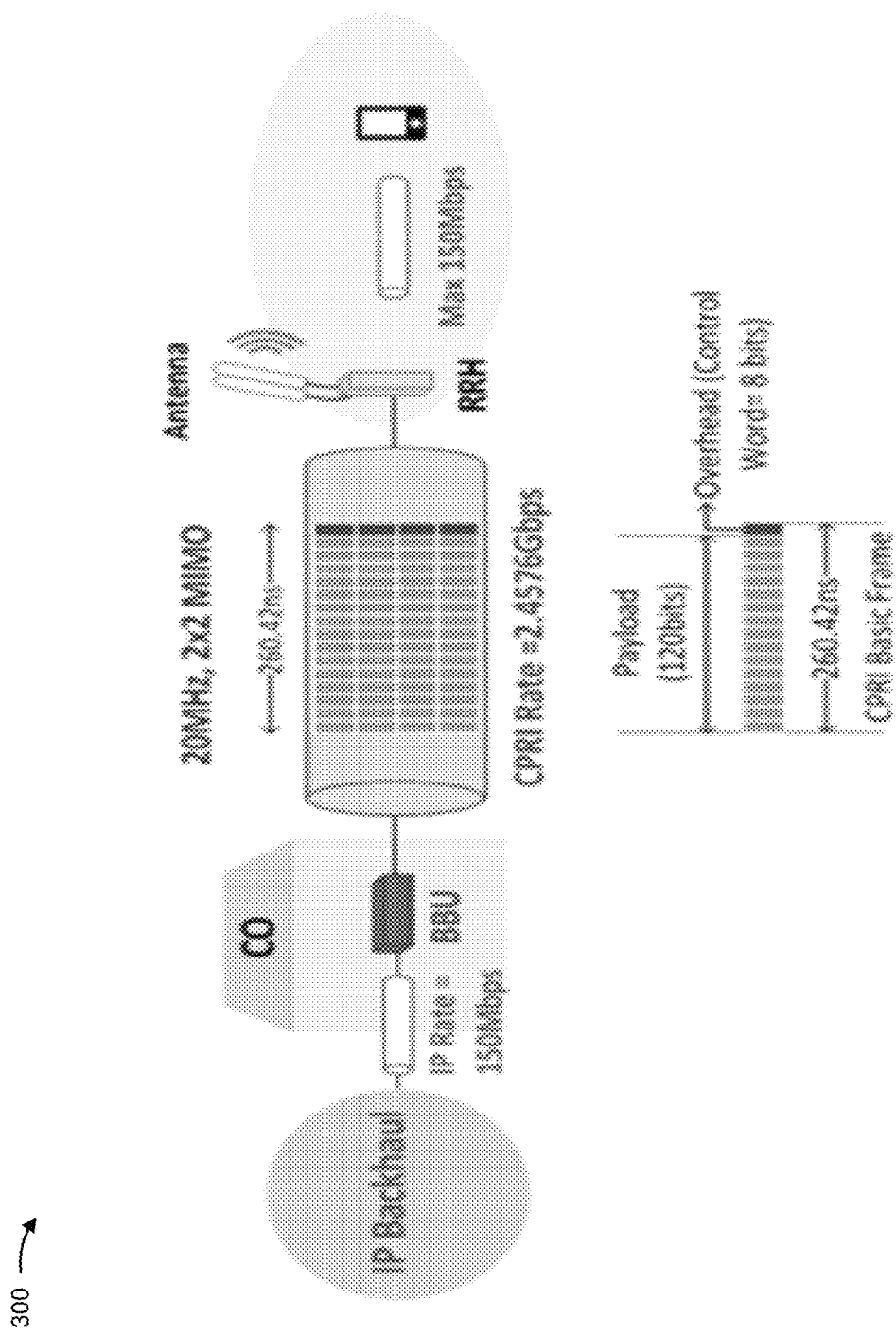
FIG. 3 depicts a system architecture of a CPRI front-haul implementation for providing front-haul data awareness, according to an exemplary embodiment.

FIG. 3 is an example implementation 300 illustrating a schematic diagram of a CPRI front-haul implementation where output of the BBU may be conveyed over a CPRI link to a remote radio head RRH, where the output of the BBU may be equivalent to the output of the IFFT that is presented to the RRU interface in FIG. 1.

In view of the foregoing, it should be appreciated that several embodiments and implementations may be considered.

Figure 4:
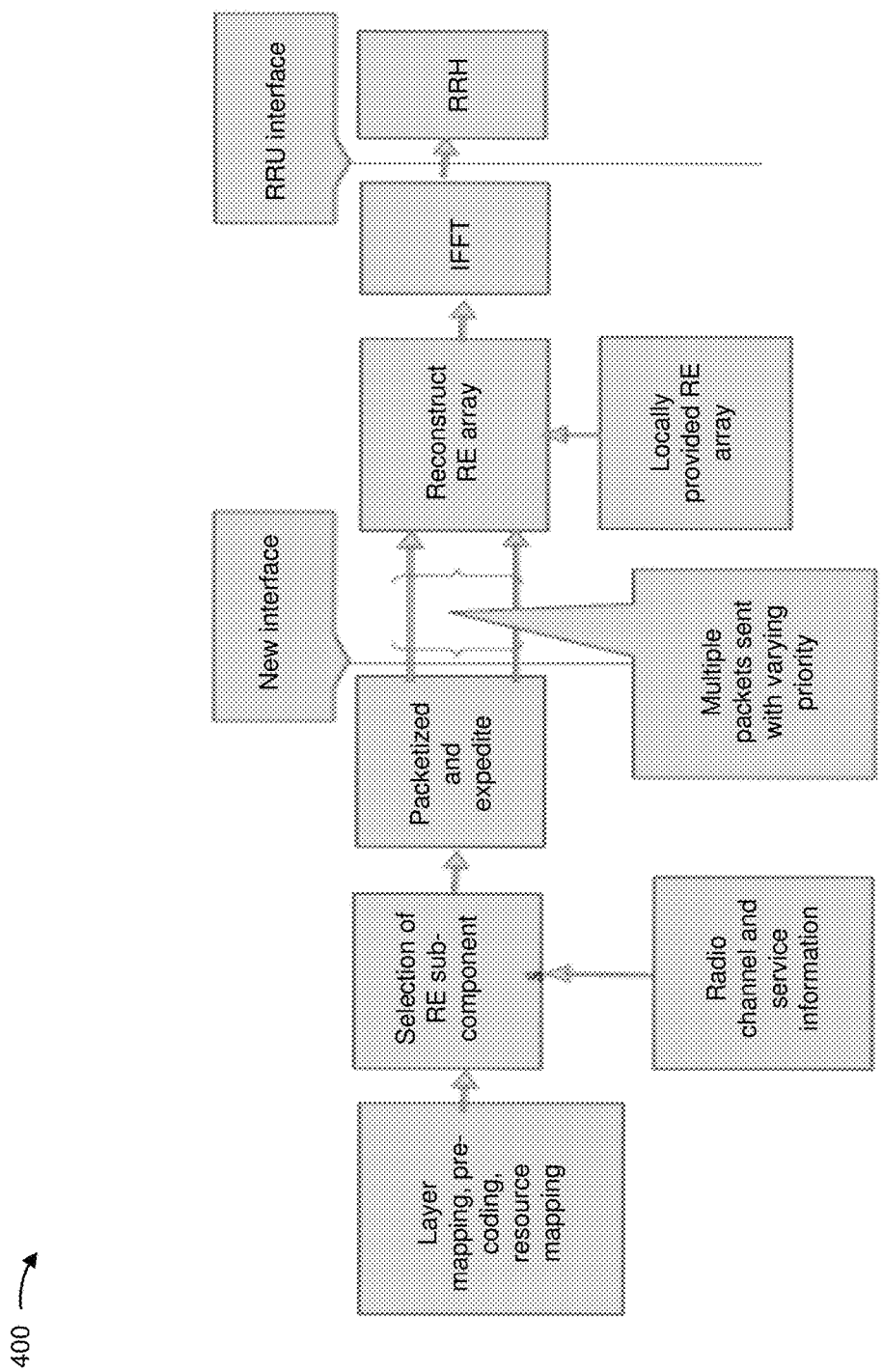
FIG. 4 depicts a flowchart of a method for providing front-haul data awareness, according to an exemplary embodiment.

FIG. 4 is an example implementation 400, illustrating a flowchart of a method for providing front-haul data awareness, according to an exemplary embodiment. Although FIG. 4 is described in terms of downlink CoMP, implementations, described herein, may also apply to an uplink CoMP implementation. In FIG. 4, an RE array produced by the "layer mapping, pre-coding, resource mapping" function may be divided in to components that require varying levels of transport performance depending for example on information about radio channel conditions and service information. For example, control channel REs along with REs for subscribers utilizing multi-stream MIMO or multi-site CoMP may have more stringent delay and synchronization requirements, whereas REs for other users with less demanding front-haul transport requirements may be served to a less demanding service level. These data components may be packetized and sent in multiple streams with varying levels of prioritization according to the priority of their payload, for example, using Expedited Forwarding, or other protocol, for differentiated prioritization of packets.

In another example, with regard to uplink, a time-series signal may be received. In some implementations, the signal may be associated with a prioritization. For example, of a set of frequencies associated with one or more received signals, data of a first frequency may be associated with a relatively higher prioritization than data of a second frequency. As another example, of a set of signals received at a set of antenna sites, data received at a first site may be associated with a relatively higher prioritization than data receive at a second site. The device may convert the time-series signal to a digital domain, process the data of the signal based on the prioritization, and cause a portion of the data to be transmitted over a front-haul link based on processing the signal. In this case, another device (e.g., a BBU) may receive the portion of the data via the front-haul link.

Upon reception of the packets over the front-haul, the RE array may then be reconstructed. When the RE array is constructed, some of the packetized data components may be delayed meaning that some component parts of the RE array may have small offsets. In cases of small delay, this may be handled by delaying the transmission of the RE symbols so long as the resulting delay spread is not excessive and the over-all orthogonality of the symbols is maintained. In some embodiments, if delay is such that the RE cannot be transmitted in the place or location within the RE array that was intended for it without excessive delay, those delayed REs may be deferred, and no symbol may be transmitted in the intended place in the RE array. Any such delayed data may then be stored in a buffer local to the RRH and may be transmitted at a later time, for example, in a later OFDM symbol, sub-frame, or frame. Such a scheme may require an interaction with the resource allocation and HARQ process to ensure that synchronization of the data between scheduler and the UE is maintained. Additionally, in some embodiments, some parts of the RE array may be generated locally to the RRH, either by convention or negotiated as required over the front-haul interface, for example cyclic prefix and reference symbol insertion, thereby reducing the front-haul resource requirements even further.

The layer mapping, pre-coding and resource mapping stage may exploit differential priority of packets transmitted over the front-haul to place the lower priority REs at specific places in the RE array. For example, those components of the RE array that are to be transmitted earlier may be received earlier than those later in the frame. If the lower priority REs are placed earlier in the RE array, then the higher priority ones later in the RE array may have more time to arrive before they are required for transmission, and thus have a higher chance of success.

In some embodiments, locally available information may be added to the RE array at this point to make a composite RE array. This may be for reason of the connection being between two or more devices served locally by the same RRH, where the conveyance of the REs over the front-haul is not required for any reason such as the use of multi-transmission schemes for example. Another reason for locally added REs may include data deferred from earlier RE array frames that were not transmitted owing to excessive delay. Additionally, certain entire OFDM frames may be classified as having less stringent latency requirements and thus may be delayed entirely. For example, the front-haul may convey a unique RE array for each of many antennas at the RRH. Some of these may be given higher priority. Where the RE array is not received for one of the antennas, one of the RE arrays for an antenna that has been received may instead be transmitted in place of the RE array that has been delayed in transmission. Consequently, this new interface may allow optimization and compression of the front-haul data, which may provide significant benefits for the practical implementation, cost, and complexity of a front-haul system.

The reconstructed and optionally composite RE array may then passed to the IFFT function that generates an I-Q stream. In some implementations, processing performed on information that is to be transmitted via the front-haul link (or has been transmitted via the front-haul link) in the downlink direction, may be processed based on information that is to be transmitted (or has been transmitted) in the uplink direction. For example, based on a quantity of data for transmission in the uplink direction, a portion of data for transmission in the downlink direction may be dropped. Similarly, based on the quantity of data for transmission in the downlink direction, a portion of data for transmission in the uplink direction may be dropped.

The system described herein may also provide a mechanism to measure transmission characteristics on the front-haul links associated with a cell (or CoMP cell group.) For example, these transmission characteristics may include bandwidth availability, delay, and jitter. These measurements may be made on each of a set of sub links in a variety of connection topologies, for example, loop and star topologies, with or without redundancies. These measurements of transmission characteristics may be used to perform optimization, for example, considering the numbers of users at a cell (or CoMP cell group) that may be supported with 1 antenna, 2 antennas, . . . , up to 8 antennas within current LTE-A, and also considering what transmission mode maybe supported for the associated antennas. In this way, the benefit of multi-stream schemes, such as MIMO, CoMP, multi-cell CA, or the like may be balanced against the varying front-haul link characteristics (e.g., utilization or latency) in order to achieve a degree of utilization of the transmission schemes that enhances the benefit of the subscriber of these schemes while avoiding overloading or degrading the front-haul links. This optimization may also consider connection topology in order to exploit, for example, link redundancy. Other characteristics of the system may also be optimized in concert with the utilization of multi-stream schemes and/or front-haul utilization. For example, a choice of which RRH or RRHs each allocation of subscriber device will communicate with may be changed in some cases to alleviate front-haul overload. For example, subscriber devices may be served by one or more RRH that is less than optimal from a purely radio consideration where that decision alleviates congestion, or similar overload phenomena on one or more front haul links, leading to an overall superior system configuration. Other characteristics of the system that may be modified to achieve an optimization in concert with the front haul utilization may include antenna direction, down tilt, beam width, transmission powers of certain types of REs (e.g., for example reference symbols), or the like. This optimization may be dynamic to respond to sudden changes such as failure of links, RRHs, or other elements, sudden changes in user behavior such as public gatherings and sporting events. This optimization may also be in response to the changes in normal usage of the network so that that system may be better configured to achieve operator metrics, subscriber quality of experience, or the like.

The interface between the "layer mapping, pre-coding, resource mapping" function and the IFFT function may carry the LTE user plane and control protocol stack, adding an additional layer 2 frame protocol and layer 1 transport layer. The new interface may aim to be transparent for the highest priority data; however, the scheduling and prioritization activities may lead to packet delay and data losses in some scenarios. This data loss may be managed by an LTE MAC/RLC that handles ARQ and transport channel to be used. Additionally, greater scope for optimization may be realized by providing an input to the MAC/RLC about the availability of front-haul bandwidth to an antenna, antenna group, cell, or cell group that may be used in a communication to a mobile. In this manner, scheduling of data that cannot be delivered due to front-haul limitations may be avoided.

While the description above is focused on the downlink direction, similar benefits may be realized in the uplink in the event data is scheduled to allow simple extraction of the data component that is to have differential backhaul treatment, for example, if the data component is scheduled solely in one of the available sub-frames. Additionally, as the uplink utilizes SFDMA—each symbol may contain only components of a single frequency, as opposed to the multi sub-carrier symbols used in the downlink, the data components may receive differential treatment based on a symbol basis. Thus, if the data components are mapped to specific sets of symbols differentiation may be achieved. Data that is to be combined for a MIMO or CoMP purpose may then be scheduled in a way that allows easy separation in the uplink direction.

Treatment of common channels and reference symbols may be different as the information content is lower. There may also be an option for storage and/or local generation at the RRH for such symbols.

An alternative implementation may be to provide multiple streams of CPRI style front-haul with differential performance. These may then be further combined in the RRH by using an equivalent operation to the addition in the frequency domain, for example, by a convolution of the two data streams or other scenario.

It should be appreciated that splitting the architecture before the IFFT stage and allowing differential service levels to be provided for components of the RE array may provide improved or enhanced front-haul data awareness.

Figure 5:
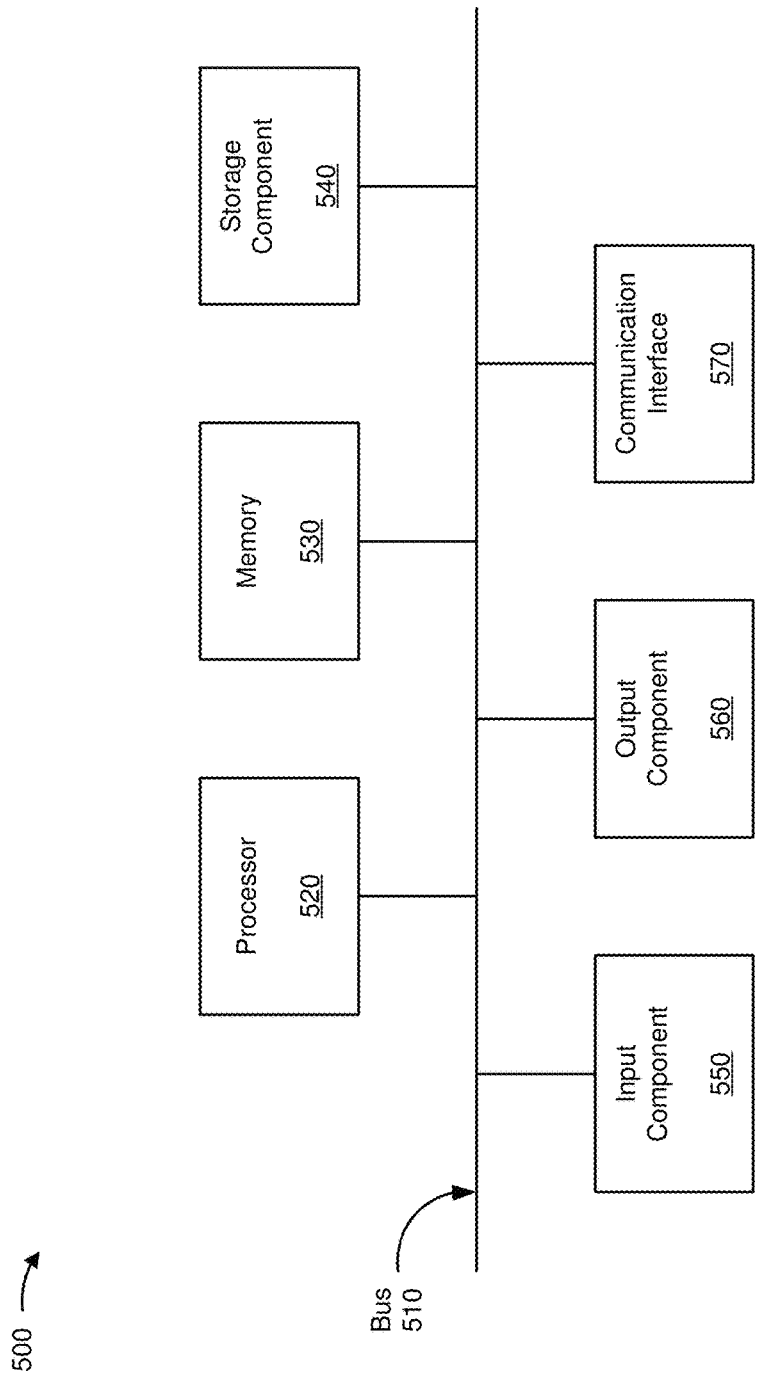
FIG. 5 depicts a diagram of example components of one or more devices of FIGS. 1-4.

FIG. 5 is a diagram of example components of a device 500. Device 500 may correspond to one or more devices described herein and may perform one or more of the operations described with regard to FIG. 4. In some implementations, a system described herein may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. In some implementations, processor 520 may include one or more processors that can be programmed to perform a function. Memory 530 includes a random access memory (RAM), a read only memory (ROM), and/or another type of dynamic or static storage device (e.g., a flash memory, a magnetic memory, an optical memory, etc.) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, a microphone, etc.). Additionally, or alternatively, input component 550 may include a sensor for sensing information (e.g., a global positioning system (GPS) component, an accelerometer, a gyroscope, an actuator, etc.). Output component 560 includes a component that provides output information from device 500 (e.g., a display, a speaker, one or more light-emitting diodes (LEDs), etc.).

Communication interface 570 includes a transceiver-like component (e.g., a transceiver, a separate receiver and transmitter, etc.) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, a radio frequency (RF) interface, a universal serial bus (USB) interface, a Wi-Fi interface, a cellular network interface, or the like.

Device 500 may perform one or more processes described herein. Device 500 may perform these processes in response to processor 520 executing software instructions stored by a non-transitory computer-readable medium, such as memory 530 and/or storage component 540. A non-transitory computer-readable medium is defined herein as a non-transitory memory device. A memory device includes memory space within a single physical storage device or memory space spread across multiple physical storage devices.

Software instructions may be read into memory 530 and/or storage component 540 from another non-transitory computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

The description herein describes network elements, computers, and/or components of a system and method for providing front-haul data awareness. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

While embodiments herein are described with reference to providing front-haul data awareness, it should be appreciated that the term "front-haul" may refer to information, components, connections, links, or segments associated with a mobile network between a new network architecture of centralized baseband controllers and remote standalone radio heads at cell sites. In other words, front-haul may include one or more elements that allow distribute networks, such as LTE-Advanced networks, Cloud-RAN (C-RAN), or other similar networks, to provide faster and greater coverage.

Mobile devices, as described herein, may include a variety of communications systems and/or devices. For example, such systems and/or devices may include desktop computers, laptops/notebooks, tablets, personal digital assistants (PDA), smart phones, wireline phones, cellular phones, mobile phones, satellite phones, MP3 players, video players, personal media players, personal video recorders (PVR), watches, gaming consoles/devices, navigation devices, televisions, printers, fitness devices, medical devices, and/or other devices capable of receiving and/or transmitting signals. It should be appreciated that a mobile device may be used independently or may be used as an integrated component in another device and/or system (e.g., an automobile).

It should be appreciated that the system, as described herein, may be connected to a variety of other systems both backend and frontend. In order for the systems, configurations, and modules, as described herein, to provide various services to its subscribers, the system described herein may be communicatively coupled to a base station, which in turn may be communicatively coupled to one or more servers, via the BSC, which in turn may access a variety of databases. These databases may store a variety of information. For example, the databases may store information that identifies subscribers using its service and for which service features are subscribed. The databases may store information, such as a subscriber's customer name, identification number, services, or other identifiers, and/or whether a user's mobile devices are switched on or off. It should be appreciated that these databases may be highly robust and may further any other information suitable for providing front-haul data awareness.

It should be appreciated that the contents of databases described herein may be combined into fewer or greater numbers of databases and may be stored on one or more data storage systems and in more than one formats. The data storage systems may be local, remote, or a combination thereof to clients systems, servers, and/or other network components. Information stored in the databases may be useful in, for example, providing front-haul data awareness, and/or other related services.

Communication between the various base stations, mobile devices, network components, service providers, and/or subscribers may be achieved via transmission of electric, electromagnetic, or wireless signals and/or packets that carry digital data streams using a standard telecommunications protocol and/or a standard networking protocol. These may include Session Initiation Protocol (SIP), Voice over IP (VOIP) protocols, Wireless Application Protocol (WAP), Multimedia Messaging Service (MMS), Enhanced Messaging Service (EMS), Short Message Service (SMS), Global System for Mobile Communications (GSM) based systems, Code Division Multiple Access (CDMA) based systems, Universal Mobile Telecommunications Systems (UMTS), Transmission Control Protocol/Internet (TCP/IP) Protocols, Long Term Evolution (LTE), or the like. Other protocols and/or systems that are suitable for transmitting and/or receiving data via packets/signals may also be provided. For example, cabled network or telecom connections such as an Ethernet RJ45/Category 5 Ethernet connection, a fiber connection, a traditional phone wireline connection, a cable connection or other wired network connection may also be used. Communication between the network providers and/or subscribers may also use standard wireless protocols including IEEE 802.11a, 802.11b, 802.11g, 802.11n, 802.11ac, or the like, or via protocols for a wired connection, such as an IEEE Ethernet 802.3.

By providing front-haul data awareness using at least the techniques described herein, a more reliable and accurate way to reduce cost and complexity of remote radio head (RRH) deployment, particularly when more complex implementation scenarios are considered, for example, in uplink or downlink CoMP (coordinated multipoint), multi-site carrier aggregation, higher MIMO in 5G and beamforming, or the like, may be provided, and therefore, may therefore optimize network performance and satisfaction.

While the features and functionalities for providing front-haul data awareness are primarily discussed with respect to the embodiments above, it should be appreciated that the features and functionalities of one embodiment may be similarly applied to other embodiments. Furthermore, embodiments described herein may be readily appreciated that the features and functionalities described herein may be used in conjunction with other various technologies as well.

In the preceding specification, various embodiments have been described with reference to the accompanying drawings. It will, however, be evident that various modifications and changes may be made thereto, and additional embodiments may be implemented, without departing from the broader scope of the disclosure as set forth in the claims that follow. The specification and drawings are accordingly to be regarded in an illustrative rather than restrictive sense.

At this point it should be noted that for providing front-haul data awareness in accordance with the present disclosure as described above typically involves the processing of input data and the generation of output data to some extent. This input data processing and output data generation may be implemented in hardware or software. For example, specific electronic components may be employed for providing front-haul data awareness, in accordance with embodiments described above. Alternatively, one or more processors operating in accordance with instructions may implement the functions associated with for providing front-haul data awareness in accordance with embodiments as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes.

What is claimed is:

1. A device, comprising:
    one or more processors to:
        receive, via a plurality of data streams of a front haul link, a set of packets including information for transmission of a time-frequency resource element array via an air interface,
            the set of packets having been sent with varying levels of data prioritization relating to transmission via the air interface,
            the set of packets including information of the time-frequency resource element array;
        reconstruct a set of time-frequency resource elements of the time-frequency resource element array based on the varying levels of data prioritization of the set of packets,
            where the one or more processors, when reconstructing the set of time-frequency resource elements, are configured to:
                identify a set of symbols included in the set of packets,
                determine that a first symbol, of the set of symbols, is associated with a higher prioritization than a second symbol, of the set of symbols, based on the varying levels of data prioritization,
                identify a first portion of a particular time-frequency resource element assigned to receive data associated with a higher prioritization than data received in a second portion of the particular time-frequency resource element,
                    the first portion of the particular time-frequency resource element being associated with being transmitted after the second portion of the particular time-frequency resource element, and
                include the first symbol in the first portion of the particular time-frequency resource element and the second symbol in the second portion of the particular time-frequency resource element; and
        transmit, via the air interface, the set of time-frequency resource elements of the time-frequency resource element array.

2. The device of claim 1, where the one or more processors are further to:
    determine a characteristic of the air interface,
        the characteristic of the air interface relating to the varying levels of data prioritization,
        the characteristic of the air interface relating to at least one of:
            a bandwidth availability,
            a delay, or
            a jitter; and
    provide information identifying the characteristic of the air interface to a base band unit to cause the base band unit to transmit the set of packets via the plurality of data streams.

3. The device of claim 1, where the one or more processors, when transmitting the time-frequency resource element array, are to:
    generate an I-Q data stream based on reconstructing the set of time-frequency resource elements of the time-frequency resource element array; and
    transmit the I-Q data stream.

4. The device of claim 1, where the one or more processors are further to:
    generate one or more packets,
        the one or more packets being different from the set of packets received via the plurality of data streams of the front haul link; and
    where the one or more processors, when reconstructing the set of time-frequency resource elements, are to:
        include the one or more packets in the set of time-frequency resource elements.

5. The device of claim 1, where the one or more processors, when transmitting the set of time-frequency resource elements of the time-frequency resource element array, are to:

transmit one or more packets toward a particular mobile device,
the particular mobile device being associated with a service level corresponding to a data prioritization for the one or more packets.

6. The device of claim 1, where the one or more processors, when receiving the set of packets, are to:
receive a portion of a dataset via the set of packets,
the dataset being intended for transmission via the air interface,
the portion of the dataset being selected for transmission via the front haul link based on the varying levels of data prioritization or a characteristic of the air interface,
another portion of the dataset being excluded from the set of packets and dropped based on the varying levels of data prioritization or the characteristic of the air interface.

7. The device of claim 1, where the front haul link is a common public radio interface front haul link.

8. A device, comprising:
one or more processors to:
receive, via a plurality of data streams of an air interface, a set of signals including information for transmission of a time-frequency resource element array over a front haul link,
the set of signals having been sent with varying levels of data prioritization relating to reception via the air interface,
the set of signals including information related to a time-frequency resource element array;
select a portion of data included in the set of signals for transmission via the front haul link based on the varying levels of data prioritization;
transmit, via the front haul link, the selected portion of data;
receive, via another plurality of data streams of the front haul link, another set of signals including information for transmission of another time-frequency resource element array via the air interface,
the other set of signals having been sent with other varying levels of data prioritization relating to transmission via the air interface,
the other set of signals including information related to the other time-frequency resource element array;
reconstruct a set of time-frequency resource elements of the other time-frequency resource element array based on the other varying levels of data prioritization of the other set of signals,
where the one or more processors, when reconstructing the set of time-frequency resource elements, are configured to:
identify a set of symbols included in the other set of signals,
determine that a first symbol, of the set of symbols, is associated with a higher prioritization than a second symbol, of the set of symbols, based on the other varying levels of data prioritization,
identify a first portion of a particular time-frequency resource element assigned to receive data associated with a higher prioritization than data received in a second portion of the particular time-frequency resource element,
the first portion of the particular time-frequency resource element being associated with being transmitted after the second portion of the particular time-frequency resource element, and
include the first symbol in the first portion of the particular time-frequency resource element and the second symbol in the second portion of the particular time-frequency resource element; and
transmit, via the air interface, the set of time-frequency resource elements of the other time-frequency resource element array.

9. The device claim 8, where the one or more processors are further to:
identify a first subset of time-frequency resource elements of the other set of signals for inclusion in the other time-frequency resource element array based on the other data prioritization;
identify a second subset of time-frequency resource elements of the other set of signals for exclusion from the other time-frequency resource element array based on the other data prioritization; and
where the one or more processors, when reconstructing the set of time-frequency resource elements are to:
include the first subset of time-frequency resource elements and exclude the second subset of time-frequency resource elements.

10. The device of claim 8, where the other set of signals is a portion of a dataset for transmission via the air interface,
another portion of the dataset for transmission via the air interface being dropped prior to transmission via the front haul link based on the varying levels of data prioritization,
the portion of the dataset being received via the front haul link based on being selected for transmission based on the varying levels of data prioritization.

11. The device of claim 8, where the one or more processors are further to:
select another portion of the data included in the set of signals that is not be transmitted via the front haul link; and
drop the other portion of the data.

12. The device of claim 8, where the one or more processors, when receiving the set of signals, are to:
receive the set of signals via a set of co-located antennas,
the set of signals being included in a multi-stream multiple-input, multiple-output (MIMO) transmission, or
receive the set of signals via a set of multi-site coordinated multipoint (CoMP) antennas.

13. The device of claim 8, where the front haul link is a common public radio interface front haul link.

14. A method, comprising:
receiving, by a device, data for transmission of a time-frequency resource element array via an air interface to one or more mobile devices,
the data having been sent with varying levels of a data prioritization parameter relating to transmission via the air interface;
selecting, by the device, a remote radio head (RRH) for performing the transmission of the time-frequency resource element array via the air interface to the one or more mobile devices;
reconstructing, by the device, a set of time-frequency resource elements of the time-frequency resource element array based on the varying levels of the data prioritization parameter of the data, where reconstructing the set of time-frequency resource elements includes:
identifying a set of symbols included in the data,
determining that a first symbol, of the set of symbols, is associated with a higher prioritization than a second symbol, of the set of symbols, based on the varying levels of the data prioritization parameter,
identifying a first portion of a particular time-frequency resource element assigned to receive data associated with a higher prioritization than data received in a second portion of the particular time-frequency resource element,
the first portion of the particular time-frequency resource element being associated with being transmitted after the second portion of the particular time-frequency resource element, and
including the first symbol in the first portion of the particular time-frequency resource element and the second symbol in the second portion of the particular time-frequency resource element; and
transmitting, by the device, the data for transmission of the time-frequency resource element array to the RRH.

15. The method of claim 14, where selecting the RRH comprises:
selecting the RRH based on the varying levels of the data prioritization parameter and based on a characteristic of a particular data stream or the air interface.

16. The method of claim 14, where transmitting the data comprises:
transmitting the data via a set of packets,
the RRH being caused to arrange the set of packets and one or more other packets received via one or more other data streams for transmission via a resource element array based on the varying levels of the data prioritization parameter for the data and one or more other prioritization parameters relating to the one or more other packets.

17. The method of claim 14, further comprising:
causing a first portion of the data to be transmitted by the RRH via a first transmission; and
causing a second portion of the data to be stored via a data structure of the RRH for transmission via a second transmission,
the second transmission occurring after the first transmission.

18. The method of claim 14, where a front haul link traverses a set of sublinks connecting the RRH to the device; and
where transmitting the data comprises:
transmitting the data toward the RRH via the set of sublinks,
the set of sublinks being associated with a particular topology.

19. The method of claim 18, where the front haul link is a common public radio interface front haul link.

20. The method of claim 14, further comprising:
determining the varying levels of the data prioritization parameter based on a delay requirement or a synchronization requirement associated with the data;
selecting a particular data stream from a set of data streams based on the varying levels of the data prioritization parameter; and
where transmitting the data comprises:
transmitting the data based on selecting the particular data stream.

* * * * *